Patented Oct. 9, 1951

2,570,476

UNITED STATES PATENT OFFICE 2,570,476

WIRE COATING COMPOSITION

Emil H. Olson, Muskegon, Mich., assignor to Anaconda Wire and Cable Company, a corporation of Delaware No Drawing. Application February 15, 1949, Serial No. 76,661

3 Claims. (Cl. 106—187)

This invention relates to an improved wire coating composition for use in making insulated magnet wire of the enameled wire type. More particularly, the invention is directed to an improved wire coating composition that solidifies about at room temperature by gelation rather than by solvent evaporation, and that comprises an ester of cellulose with at least one aliphatic acid containing 2 to 4 carbon atoms dissolved in an improved solvent composed of a low-boiling aliphatic alcohol, a low-boiling aromatic hydrocarbon, and a low-boiling ketone.

The preparation of lacquers that set by gelation, using a cellulose ester as the solute component, have been known for some years and have enjoyed some success as dipping lacquers. Such dipping lacquers are not satisfactory for coating magnet wire, however, because (a) they must be applied too slowly for economical application to wire, (b) gelation of the coating proceeds too slowly to permit handling of the wire, e. g., by passing it over a pulley or capstan, as soon as is required in commercial wire manufacturing operations, (c) the coating formed by such lacquers adheres very poorly to the wire, and (d) such coating is much too thick and non-uniform to be acceptable to the electrical trade. Efforts to apply a conventional gelable dipping lacquer to wire by thinning it and passing wire through it at high speed are sometimes successful in yielding a coating thin enough for practical use, but coatings so made do not gel rapidly enough to permit the wire to be handled, without damage to the coating, in the manner that is necessary for economical wire coating operations, and adherence of the coating to the wire is very poor.

The present invention provides an improved gelable lacquer composition that may be applied rapidly to bare copper magnet wire, even in very small sizes, which gels rapidly on the wire, and which forms a coating that is adequately thin, uniform and adherent. The new wire coating composition is made up of an ester of cellulose with at least one aliphatic acid containing from 2 to 4 carbon atoms dissolved in a solvent composed essentially of 15% to 30% by weight of a low-boiling aliphatic alcohol, 50% to 60% by weight of a low-boiling aromatic hydrocarbon, and 10% to 30% by weight of a low-boiling ketone. Particularly satisfactory compositions result when the alcohol component of the solvent is used in an amount within the range from 20% to 25% by weight, and when the ketone is one containing from 3 to 6 carbon atoms and is also used in an amount within the range from 20% to 25%. The amount of cellulose ester dissolved in the solvent is preferably upwards of 12% (say from 12% to 15%) by weight of the composition, but in any event is sufficient to impart a viscosity of 600 to 1500 centipoises to the composition at 100° F. It is also generally desirable (but not essential) to incorporate in the composition a chemically inert pigment or opaquing agent in an amount from 3% to 10% by weight of the cellulose ester.

The cellulose esters that are used in the new lacquer composition are the same that have been used heretofore in dip-coating lacquers, and include cellulose acetate, cellulose propionate and cellulose butyrate, and mixed esters such as cellulose acetate propionate (containing say 15% to 20% acetyl and 25% to 35% propionyl) and cellulose acetate butyrate (containing say 12% to 18% acetyl and 15% to 40% butyryl).

The principal feature of the new composition is the solvent base in which the cellulose ester is dissolved. I have found that the character of the coating formed on the wire, and the rate at which it gels, depends to a substantial extent on the nature of the solvent. Coatings formed from compositions made with the solvents heretofore used in preparing gelable dip lacquers gel so slowly that the wire cannot be handled (as by passing it over a pulley) within the time required (10 seconds or less) for economical wire manufacture; and they are so poorly adherent to copper wire that they strip off in tube form when the wire is stretched and broken. On the other hand, coatings formed from lacquers made with the solvent base contemplated by the invention gel very rapidly on the wire (they often can be handled within 5 seconds of application of the coating), and they adhere remarkably well to the wire under even severe stretching.

The inclusion in the solvent composition of a low-boiling ketone (i. e. a ketone with from 3 to 6 carbon atoms boiling at a temperature of about 100° C. or less at atmospheric pressure) is especially advantageous. Ketones such as diethyl ketone, methyl ethyl ketone, and methyl tertiary butyl ketone may be used, but in general I find acetone (dimethyl ketone) to be the most desirable. The presence of a low-boiling ketone does more to promote effective adhesion of the lacquer coating to the wire than any other component of the solvent. It appears to cause the coating composition while still fluid to enter into exceptionally intimate contact with the wire surface, and it is my present belief that such intimate contact, conforming to and even penetrating into microscopic irregularities on the wire surface, is to some extent at least responsible for the improved adhesion of the coating to the wire. Furthermore, the presence of a ketone considerably increases the rate at which the coating on the wire gels, and appears to be more effective in this respect than any other component of the solvent. It also promotes formation of a coating of greater smoothness and uniformity in thickness than is obtained using a composition containing no ketone in the solvent mixture. To obtain these advantages in full measure, the low-boiling ketone should be used in an amount to constitute 10% to 30% by weight of the solvent, and I prefer to use it in an amount from 20% to 25% by weight of the solvent.

The solvent also contains a low-boiling aliphatic alcohol containing 1 to 5 carbon atoms and a low-boiling aromatic hydrocarbon. By "low-boiling" alcohol I mean one that boils at a temperature of about 100° C. or less at atmospheric pressure, and by "low-boiling aromatic hydrocarbon" I mean benzene or a homologue of benzene that boils at a temperature below 150° C. at atmospheric pressure. Methyl alcohol, ethyl alcohol, normal or iso-propyl alcohol, or even a butyl or an amyl alcohol may be used as the alcoholic component of the solvent. Of these alcohols, commercial ethyl alcohol denatured with methyl alcohol is perhaps the most satisfactory. It is also possible to use various commercial alcohol-base solvent mixtures, and one of the most satisfactory alcoholic components for the solvent mix is a commercial product composed of about 92% ethyl alcohol, about 4.6% methyl alcohol, about 1.4% methyl isobutyl ketone, about 1% ethyl acetate, and about 1% hexane, all percentages by weight. Such commercial composition is included within the scope of the term "alcohol" in defining the composition of the new solvent base. The alcohol constitutes 15% to 30% by weight of the solvent composition, and preferably is used in an amount from 20% to 25% by weight.

The aromatic hydrocarbon used in the solvent composition serves primarily as a diluent. Any low-boiling aromatic hydrocarbon such as benzene, toluene, or xylene, or a mixture of such compounds, may be used. In general toluene has proved to be the most satisfactory aromatic diluent of those commercially available. The aromatic compound (or mixture of such compounds) is used in an amount from 50% to 60% by weight of the solvent.

The lacquer composition may with advantage include a small amount of inert (organic or inorganic) pigment or opaquing agent such as magnesium silicate, titanium dioxide, ferric oxide, lead chromate, or a phthalocyanine pigment. It is not necessary that any pigment or opaquing agent be used, but if it is used it is preferable to employ it in an amount in the range from 3% to 10% on the weight of the cellulose ester. The pigment or filler should be of the best grade, with a particle size approximating one micron or less. Pigments of particle size significantly larger than one micron are likely to render the coating on the wire rough and prevent the composition from flowing evenly on the wire to give a coating of uniform thickness.

A very satisfactory coating composition according to the invention consists essentially of about 13% by weight of cellulose acetate butyrate dissolved in a solvent consisting essentially of about 22% by weight of ethyl alcohol, about 55% by weight of toluene, and about 22% by weight of acetone, and containing a chemically inert pigment in the amount of about 7.5% by weight of the cellulose acetate butyrate intimately dispersed therein. This composition gels to a nonflowing solid at about 65° F. and has a viscosity of about 900 centipoises at 100° F. It is applied to a bare annealed copper wire by means of the applicator described in the copending application Serial No. 76,442, filed February 15, 1949, of Howard W. Sturgis and Emil H. Olson, Patent No. 2,558,993, at a temperature of about 100° F. and at a wire speed of 160 feet per minute (using No. 37 B. and S. gauge wire). It forms a coating 0.00015 to 0.0003 inch thick that has gelled hard enough to be passed over a pulley after traveling less than 20 feet (i. e. in less than 8 seconds after application to the wire), and amply hard enough to be wound into a coil or onto a spool after traveling another 20 feet (or within less than 15 seconds after its application). It can even be touched lightly with the finger, without serious damage, after traveling only about 4 feet from the point of application, or within less than 2 seconds after it has been applied. One coat suffices to produce an insulated wire equal or superior in most respects to enamel wire having three to five coats of conventional oleo-resin enamel baked individually thereon.

The gelation temperature of about 65° F. is advantageous because it enables the coating composition to be applied very easily and effectively at ordinary room temperature. All of the coating compositions within the scope of the invention can be prepared to have a gelation temperature of about 65° F., and I prefer to so prepare them. At 100° F. all such compositions are viscous (600 to 1500 centipoises) but sufficiently fluid to apply even to very fine bare copper wire.

The preparation of the new coating composition is not easily accomplished by simply dissolving the cellulose ester in the composite alcohol-ketone aromatic hydrocarbon solvent, and accordingly the invention contemplates the provision of a particularly effective method of making it. In accordance with this method the entire amount of cellulose ester (with which the filler has been intimately admixed) is introduced into a heated vessel containing only the alcoholic component of the solvent base. The resulting mixture is stirred for at least one minute at a temperature of 75° to 125° F. in the alcohol, and the other components of the solvent (the ketone and the aromatic hydrocarbon) are added only after such preliminary stirring and heating. The cellulose ester does not dissolve fully (or even to a very substantial extent) in the alcohol during the preliminary stirring and heating period, but it is somehow conditioned thereby so as to dissolve rather rapidly when the other components of the solvent are added. Complete dissolution is effected by heating the mixture (after adding the acetone or other ketone and the aromatic hydrocarbon) at 100° to 120° F. for one to four hours. If the cellulose ester is added directly to the complete solvent base without the preliminary heating in the alcoholic component alone, the rate of dissolution is very slow, and as much as twenty-four hours may be consumed before reasonably complete dissolution is effected.

I claim:

1. A wire coating composition that sets by gelation without substantial solvent evaporation at a temperature of about 65° F. consisting essentially of a cellulose ester of at least one aliphatic acid containing from 2 to 4 carbon atoms dissolved in a solvent composed essentially of 15% to 30% of a lower monohydroxy alkanol, 50% to 60% of one of a group made up of benzene and its methyl homologues, and 10% to 30% of a lower dialkyl ketone, the amount of said ester in relation to the solvent being sufficient to impart to the lacquer a viscosity in the range from 600 to 1500 centipoises at 100° F. but being not less than 12% by weight of the composition.

2. A wire coating composition that solidifies by gelation without substantial solvent evaporation at a temperature of about 65° F. consisting essentially of a cellulose ester of at least one aliphatic acid containing from 2 to 4 carbon atoms dissolved in a solvent for said ester and having dispersed therein an inert non-metallic pigment, characterized in that (a) the maximum size of the filler particles approximates about one micron, (b) the solvent is composed essentially of 20% to 25% by weight of an aliphatic alcohol containing from 1 to 5 carbon atoms, from 50% to 60% by weight of one of a group made up of benzene and its methyl homologues, and from 20% to 25% by weight of a lower dialkyl ketone containing from 3 to 6 carbon atoms, and (c) the amount of cellulose ester does not exceed 15% by weight of the composition but is sufficient in combination with the filler to impart to the composition a viscosity of 600 to 1500 centipoises at 100° F.

3. A wire coating composition consisting essentially of about 13% by weight of cellulose acetate butyrate dissolved in a solvent consisting essentially of about 22% by weight of an ethyl alcohol, about 55% of toluol, and about 22% of acetone, and containing a chemically inert pigment in the amount of about 7.5% by weight of the cellulose acetate butyrate intimately dispersed therein, said composition gelling without substantial solvent evaporation to a non-flowing solid at about 65° F. and having a viscosity of about 900 centipoises at 100° F.

EMIL H. OLSON.

REFERENCES CITED

The following references are of record in the file of this patent:

UNITED STATES PATENTS

| Number | Name | Date |
|---|---|---|
| 1,521,859 | Bohan | Jan. 6, 1925 |
| 1,818,108 | Theumann | Aug. 11, 1931 |
| 2,417,344 | Barrett | Mar. 11, 1947 |
| 2,418,211 | Williams | Apr. 1, 1947 |
| 2,451,785 | Thau | Oct. 19, 1948 |

FOREIGN PATENTS

| Number | Country | Date |
|---|---|---|
| 21,426 | Great Britain | of 1911 |
| 254,385 | Germany | Dec. 4, 1912 |
| 13,100 | Great Britain | of 1914 |
| 298,608 | Great Britain | of 1930 |